Figure 1:
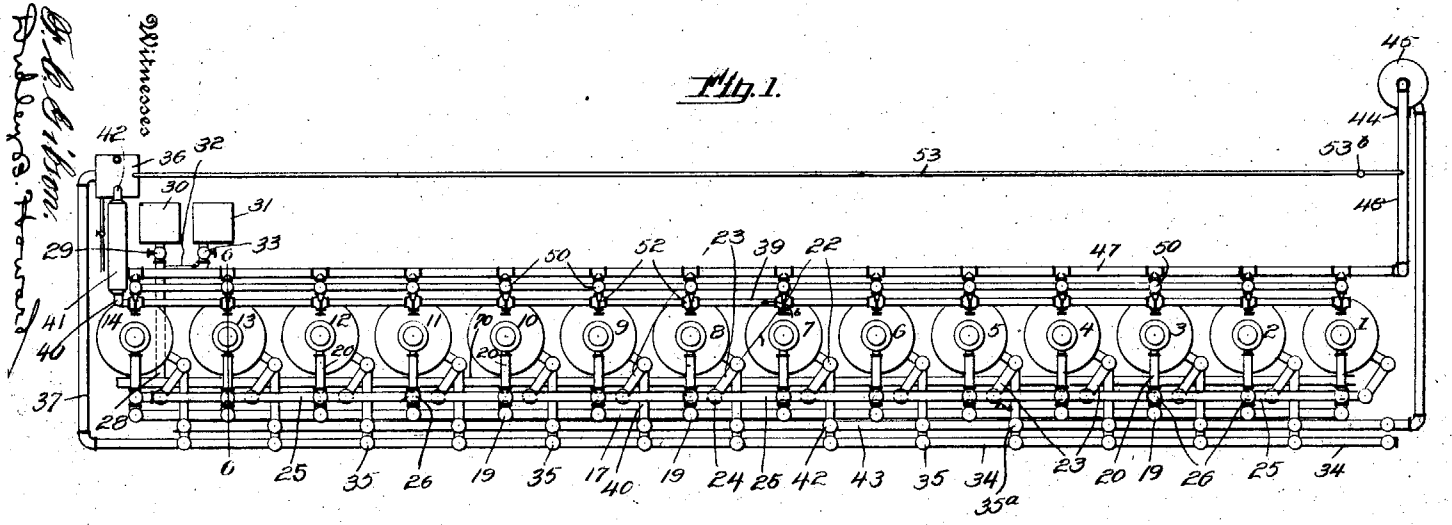

Sept. 20, 1927. W. F. HOLZHEUER Re. 16,739

EXTRACTION PROCESS AND APPARATUS

Original Filed Sept. 28, 1925 4 Sheets-Sheet 1

Witnesses

F. C. Gibson.

Dudley B. Howard

Inventor

William F. Holzheuer.

By Victor J. Evans

Attorney

Sept. 20, 1927. W. F. HOLZHEUER Re. 16,739

EXTRACTION PROCESS AND APPARATUS

Original Filed Sept. 28, 1925 4 Sheets-Sheet 2

Inventor
William F. Holzheuer.

Witnesses
F. C. Gibson.
Dudley B. Howard

By Victor J. Evans
Attorney

Sept. 20, 1927. W. F. HOLZHEUER Re. 16,739

EXTRACTION PROCESS AND APPARATUS

Original Filed Sept. 28, 1925 4 Sheets-Sheet 3

Inventor
William F. Holzheuer.

Witnesses
F. L. Gibson.
Dudley B. Howard

By Victor J. Evans
Attorney

Sept. 20, 1927. W. F. HOLZHEUER Re. 16,739

EXTRACTION PROCESS AND APPARATUS

Original Filed Sept. 28, 1925 4 Sheets-Sheet 4

Inventor
William F. Holzheuer.

Witnesses
F. L. Gibson.
Dudley B. Howard

By Victor J. Evans
Attorney

Reissued Sept. 20, 1927. Re. 16,739

UNITED STATES PATENT OFFICE.

WILLIAM FREDERICK HOLZHEUER, OF HALE, MICHIGAN.

EXTRACTION PROCESS AND APPARATUS.

Original No. 1,587,646, dated June 8, 1926, Serial No. 59,247, filed September 28, 1925. Application for reissue filed August 16, 1927. Serial No. 213,422.

My invention relates to an apparatus and process for the extraction or diffusion of the sugar content from saccharine bodies, such as sugar beet cuttings in particular.

In the process in use at the present time for extracting sugar from the sugar beet, the finely sliced beets, or cossettes, are loaded into a series of diffusion cells connected with each other thru various pipe connections to form a battery, and water is circulated from cell to cell along this battery to diffuse the sugar content from the cossettes into the water, which becomes rich in sugar as it proceeds by circulation along the length of the battery. This water is supplied under moderate pressure at the point where it enters the battery, the pressure being produced either by gravity or by some mechanical means, the specific mode being immaterial. The piping between the cells is so arranged that the course of the water is downward thru each cell and upward thru the calorisators, which are usually interposed in the pipe connections leading from the bottom of one cell to the top of the next cell.

Though the number of cells in the series forming the battery, may vary, and the size of these cells may also vary both in height and diameter, nevertheless a typical example might be described as constituting about fourteen cells, the diameter of each cell being about five foot, and the height about ten foot.

Though the exhausted cossettes are usually being dumped from one cell, while another cell is being filled, and while still another cell is undergoing the "mashing" operation, thus accounting for a total of three cells engaged in these special operations, nevertheless the remaining cells, i. e., approximately eleven cells, are connected in the series circulation of the water, which gradually becomes a rich sugar juice, as above described.

Because of the fact that each of the eleven cells in this circulation are loaded full with comparatively fine beet cuttings or cossettes, which are packed into the cells quite tightly, it is obvious that the resistance to the flow or circulation of the water along thru the length of the battery, and thru cell after cell, is quite large. and the rate of this flow, which is commonly referred to as the "circulation" is greatly retarded on account of this very considerable resistance set up by the cossettes in the cells. However, in order to maintain good efficiency in this diffusion process it is essential for various reasons to keep this rate of circulation as high as possible. Various benefits accrue if this circulation is fast, and conversely various detriments are encountered if the circulation is slow. In addition the faster the circulation the greater the capacity or total daily tonnage of cossettes that can be handled with a given amount of this diffusion battery equipment, and since many beet sugar factories find their diffusion is the slow point in their entire factory operation, their efforts are naturally interested in any improvement that will speed up the battery circulation, and thereby increase the hourly tonnage that can be handled by their battery, as such increase will immediately release the additional capacity that they have in the other machines and stations of the factory, so that the hourly tonnage or capacity of the entire factory can be increased by exactly the amount that the diffusion battery capacity is increased. This overall increase of the total factory capacity is of utmost importance, as the investment in all the machinery in a beet sugar factory, even outside the diffusion battery, is exceedingly large.

One obvious limitation against high rate of circulation in the ordinary battery operated in the usual manner, arises from the fact that the water pressure at the point where the water enters the battery, can only be raised to a moderate amount, because if it is raised above a certain point, its downward force or flow in the first few cells is so great as to draw the entire charge of cossettes in those cells downward forcibly against the bottom of the cells, and to pack these cossettes so tightly onto the bottom that they act more or less in the nature of a large valve and practically close off the flow or circulation completely, so that in place of increasing the rate of circulation by virtue of increasing the initial water pressure, just the reverse results are obtained.

In order to hold the cossettes up and prevent them from packing so tightly onto the bottom of the cell, as just described, various expedients, such as large quantities of chains hung transversely across the cells at various elevations therein, have been resorted to, with a fair degree of success, but the number of chains that can thus be hung in the cells is limited by the fact that if any excess of chains are used it becomes very difficult to load the original cossettes into the cells, and it also becomes difficult to dump the spent cossettes out of the cells, and the time lost by increased difficulty from these causes greatly offsets the benefit of increased rate of circulation. In other words the benefit derived by using chains to support the cossettes within the cells, so that a somewhat higher initial water pressure can be used in order to speed up the circulation, is limited, and those factories where this expedient has been increased to the limit of its usefulness, often for various reasons find themselves desirous of still further increasing their rate of battery circulation, but find it impossible to do this by any process or means heretofore at their disposal.

The principal object and benefits of the arrangement and new process of operating the battery, which I have invented, and which I will hereinafter describe, is directed toward effectively increasing the battery circulation in a very substantial manner, this increase being gained over the best rates of circulation heretofore produced. Briefly, my new process consists in adding to the ordinary battery operations the new step of in some way boosting the circulation pressure at a place intermediate of the ends of said battery, by passing the juice or liquor thru some pressure boosting means provided for this purpose. Preferably this pressure boosting means consists in some sort of a pump, and one very convenient place for locating it is in the connections where the liquor passes from one of the cells into another of the cells in the series. In the broader aspects of my invention, the particular arrangement and location of the apparatus by which the circulation pressure is thus boosted intermediate of the ends of the battery, is of course immaterial, and is limited only by the restrictions set forth in the appended claims, but one form of apparatus for carrying out my invention consists in adding to the ordinary piping which connects the various cells, an additional series of valves, and proper headers, so that after the water or juice has flowed approximately thru half the cells under the force of the initial pressure, it is brought thru the headers to a pressure boosting pump or means where its pressure is raised by any desired amount, and at this boosted pressure passes back into the next cell in the series, and thereby the speed of circulation thru the entire battery is considerably increased. This particular form of apparatus for carrying out my invention makes it possible to progressively change the place in the battery where the pressure is boosted, this being done by manipulating the said valves so as to progressively move ahead the place where the circulation pressure is boosted, so that this operation remains in step with the progress of the other operations progressively around the battery. Though this progressive changing of the place for boosting the circulating pressure, has some advantages, nevertheless, the apparatus and operation of same is a little more complicated than if the special valves and manipulation of same is omitted, which latter would result in leaving the pressure boosting pump or pumps connected at a fixed place or places in the battery, instead of progressively changing this place, and if this simplified form of apparatus for carrying out my invention is desired, it can be successfully used and installed by simply omitting the special series of valves previously referred to. If this is done, it should be noticed however that the essential feature of my invention is still retained, to-wit, the new step of in some way boosting the circulation pressure on the battery at some point or points intermediate of the ends thereof, so that this boosted pressure assists the initial pressure in speeding up the circulation.

As previously indicated, should it be found that merely boosting the pressure at one point in the battery is not sufficient, my invention contemplates that the pressure can be boosted at two, three or more points along the battery, the modification of the apparatus for this purpose being fairly obvious.

I will now describe one form of apparatus for carrying out my invention, but though the form which I have selected for this description is that which enables the place for boosting the pressure to be progressively changed along the length of the battery, nevertheless it should be noticed that in accordance with the foregoing remarks this place or places for boosting the circulation pressure can remain fixed at definite points in the battery instead of moving progressively along same.

Figure 2:
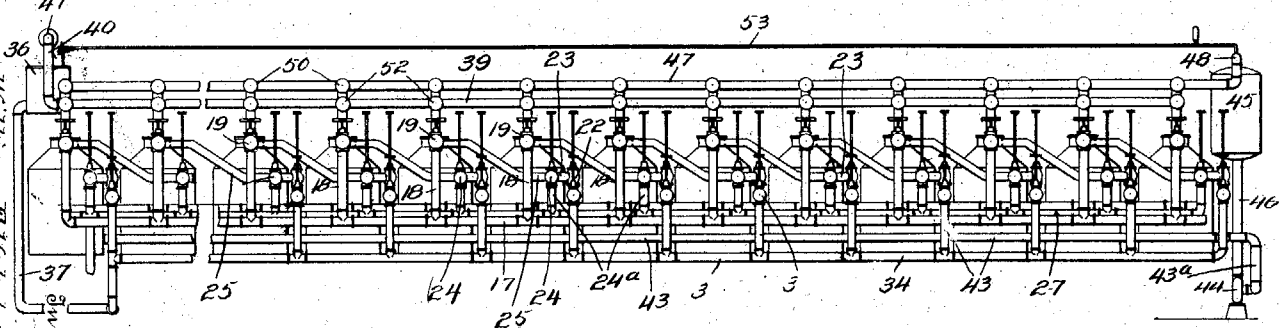
Figure 3:
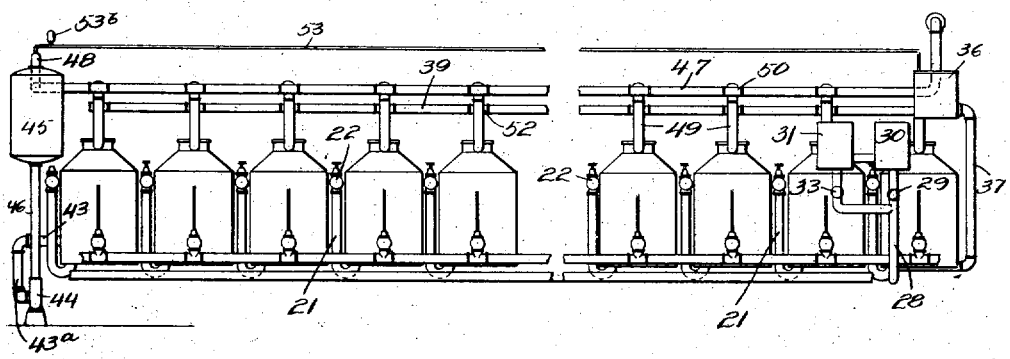
Figure 5:
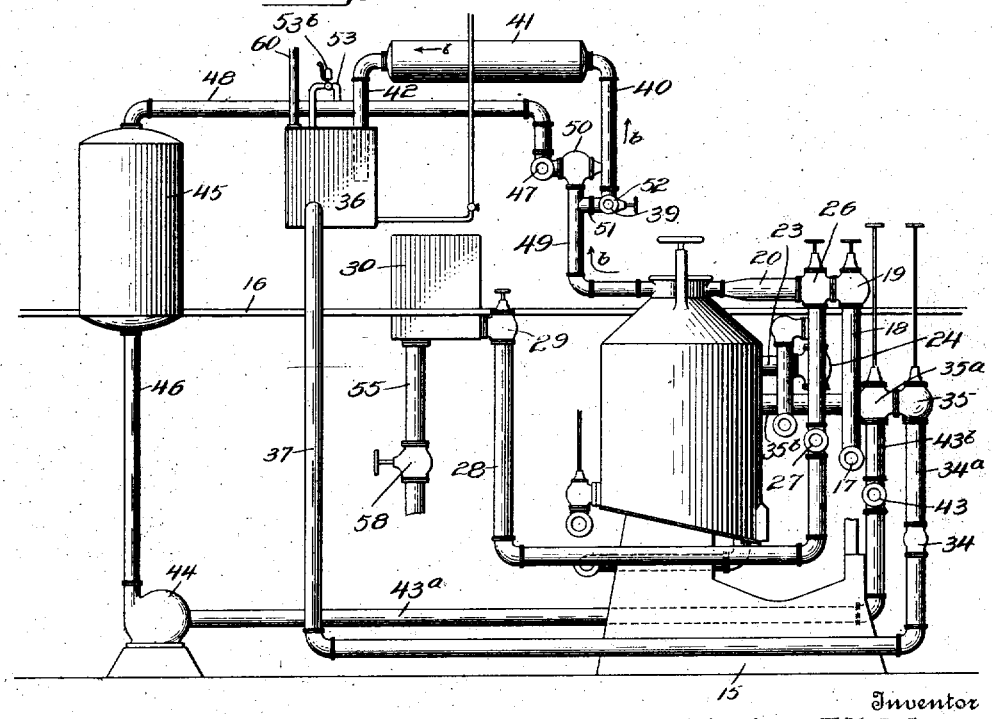
Figure 6:
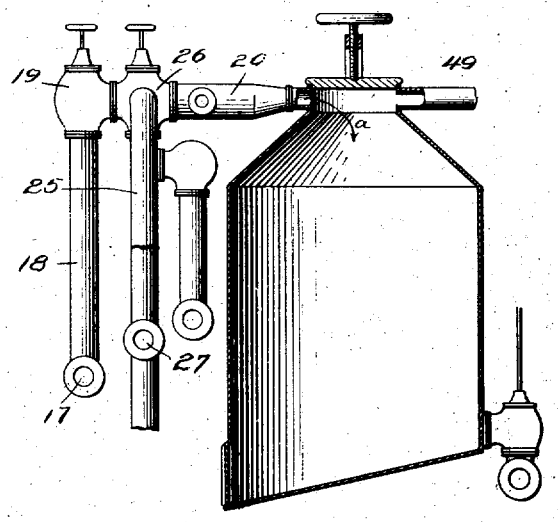
Figure 7:
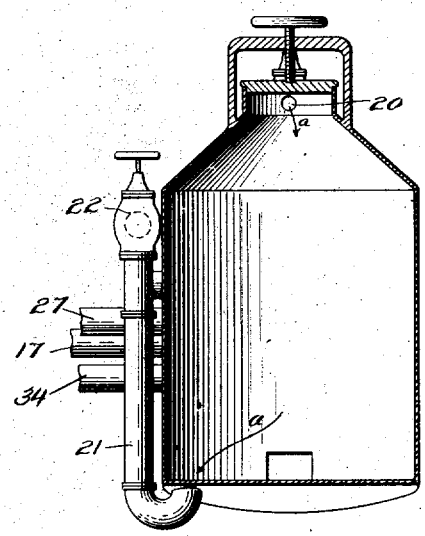
Figure 4:
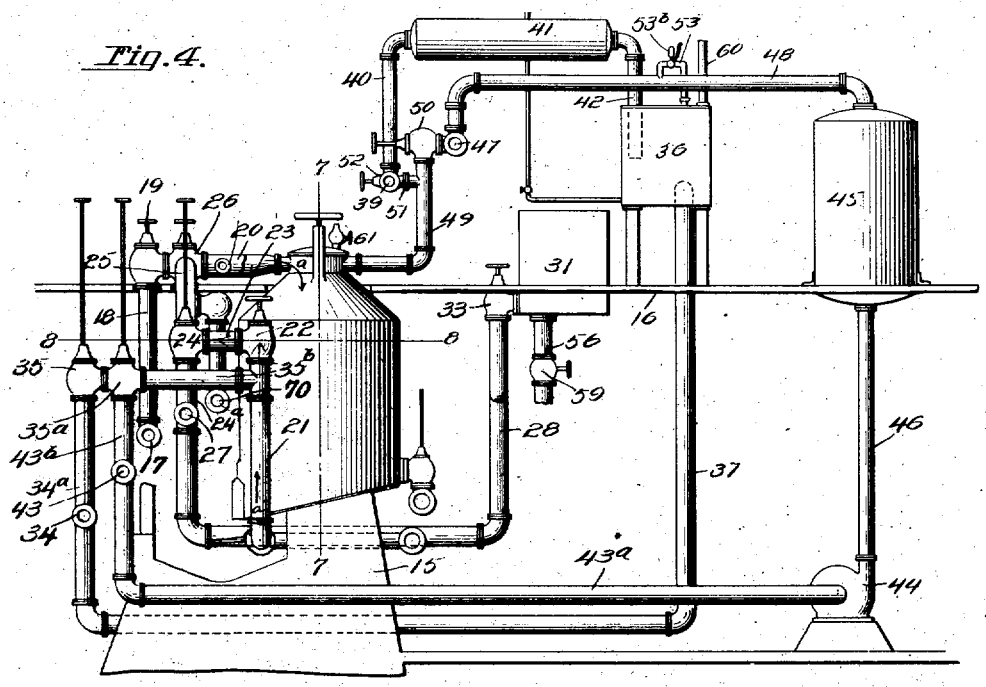
Figure 6:
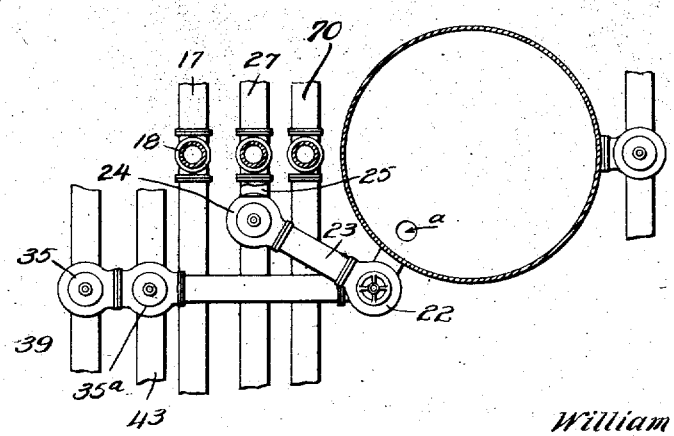

Fig. 1 is a top plan view of a battery of fourteen cells arranged in a straight line system; Fig. 2, is a front elevation of the same; Fig. 3, is a rear elevation thereof; Fig. 4, is a side elevation; Fig. 5, is another side elevation but looking in the opposite direction to Fig. 4; Fig. 6, is a transverse sectional view taken on line 6—6 of Fig. 1; Fig. 7, is a similar sectional view taken longitudinally thru a portion of the apparatus; Fig. 8, is a horizontal longitudinal sectional view on line 8—8 of Fig. 4.

In the several views of the drawings, I have shown a battery of diffusion cells, which to aid in the description, are numbered from 1 to 14 consecutively, and which are arranged in a straight line, although it is of course understood that the cells may be arranged in a curve, circle, rectangle, or in any other desired manner.

These diffusion cells are preferably mounted on a suitable foundation 15, beneath the operator's platform 16, with their upper ends protruding thru suitable apertures in said platform. A longitudinally extending water header 17, which supplies the fresh water under moderate pressure, from a source not shown, is connected with the upper ends of the respective cells by means of the pipe 18, the adjustable hand valve 19, the two-way valve 26, and the pipe 20, there being one of each of these parts in the connection leading from this water header 17 to the top of each of the cells. As is best indicated in Figs. 3, 4 and 7, a pipe 21 leads from the lower end of each diffusion cell, up to a valve 22, and if desired this vertical pipe 21, can be arranged in the manner of a calorisator for heating the juice as it comes from the bottom of one cell up thru this pipe on its way to the next cell.

As best indicated in Figs. 1 and 4, a pipe 23 connects this valve 22 with a two-way valve 24, from which the branch pipes 24[a] and 25 extend, the former being connected with a longitudinally extending header 27, which leads to a measuring tank as hereinafter described, and the pipe 25, best shown in Figs. 1, 2 and 4 being connected with the two-way valve 26, of the next succeeding cell.

The header 27 is connected at one end with the measuring tank 30, see Fig. 5, by means of a pipe 28 and the valve 29 located adjacent to the tank. A second measuring tank 31, see Figs. 1 and 4, is connected with the pipe 28 by means of a branch pipe 32, and a valve 33.

Another longitudinally extending header 34, best seen in Figs. 1, 2, 4 and 5, is connected at each cell by means of a pipe 34[a], valve 35, the two-way valve 35[a], and pipe 35[b], with the vertically rising pipe 21, previously described. If desired a storage tank 36, see Fig. 4, for receiving sweet water can be mounted on platform 16, near the end of the battery where the measuring tanks 30 and 31 are located, and this tank 36 can be connected with the adjacent end of header 34 by means of a pipe 37, communicating with the bottom of the tank.

In this case a longitudinal header 39 can be disposed above the diffusion cells, see Fig. 4, and this header 39 is at each cell provided with a valve 52 which communicates through a branch pipe 51, with the pipe 49 that enters the upper end of each cell. The end of header 39 connects with pipe 40, heater 41, and pipe 42, leading to the upper end of the storage tank 36.

In cases where the storage tank 36 is not used, the header 39 and pipes 40, 41, 42 and 37 may be omitted, their points of connection with pipes 49 and header 34, Figure 4, being of course closed or sealed by means of a proper cap or closing flange.

As is nicely indicated in Fig. 4, aided by Fig. 2, each of the vertical pipes 49 leading from the upper ends of the respective cells, is connected through a valve 50 with another longitudinally extending header 47, which may be described as the high pressure side of the booster header, as the end of this header is connected by means of pipe 48, heater 45, and pipe 46, with the discharge or high pressure side of the booster pump 44, which is used to boost the pressure in order to speed up the battery circulation in the manner indicated in a former part of this specification.

The heater 45, may, or may not be used, according as suits the taste of the designer. Also I have shown the power driven pressure boosting pump 44 as represented by a centrifugal pump, but any other kind of a power driven pump can of course be used, and same can be driven either electrically, mechanically or in any other desired manner. In this connection it might be noted that the above mentioned heaters or calorisators arranged in the pipe connections between the cells, perhaps have an exceedingly small effect on the pressure of the fluid because of the exceedingly small expansion that results from the heating effect of the calorisators, but obviously the pressure change due to this cause is so small as to be utterly negligible so far as practical operations are concerned. In fact it is impossible to measure or notice this change of pressure due to the calorisators, on any of the pressure gauges ordinarily used on these diffusion batteries. Therefore this negligible and infinitesimally small change of pressure due to the calorisators, is entirely disregarded and is not embraced within the term "boosting the pressure", etc., as used in this application.

The low pressure side of the pump or pressure boosting means 44 is connected through pipe 43[a] to the adjacent end of another longitudinally extending header 43, which latter is connected by means of pipes 43[b] with the two-way valves 35[a] from which the connection leads through pipes 35[b] and 21 to the bottom of each cell.

For obvious reasons this header 43 may be termed the low pressure header as it is the one from which the juice is drawn from one of the cells approximately in the center of the circulation, and led to the booster pump for boosting the pressure on the juice before same is passed back along header 47 and injected into the next cell following the one from which it is drawn into the header 43. In regard to the high pressure header 47, it is of course understood that all of the valves 50 leading from the respective cells, excepting one, are closed, and likewise that all of the valves 35ᵃ leading from the respective cells to the low pressure booster header 43, excepting one, are closed, and that in this way through the one valve 35ᵃ which is open, the juice is drawn from that particular cell through the header 43 into the suction side of the pump where its pressure is boosted by the pump and passed back into the high pressure header 47 where it passes through the one valve 50 which is open, into the next cell in the series. As the operations progress along the battery from cell to cell, the one valve 35ᵃ, and the one valve 50, which is open, is progressively changed from cell to cell along the battery as the operations progress, so that it is seen that the particular point in the battery at which this boosting is done progresses along the length of the battery in keeping with the other steps in the battery operations.

If it is desired to reduce the cost of installing the particular form of pressure boosting apparatus which I have just described in detail, and still retain the ability to progressively change or move ahead the place in the battery where the pressure is boosted, this can be done by omitting pipes 49 and the two-way valves 35ᵃ from every other cell, or from every two out of three cells, etc., which will reduce the cost of installation very substantially, and the labor of manipulating the omitted valves will be saved and avoided. Notwithstanding the particular omissions and simplifications just mentioned, satisfactory results will still be obtained, and the speed of battery circulation will be considerably increased above the ordinary circulation rate in which my invention of intermediately boosting the circulation pressure is not used; besides the place of boosting the circulation pressure can still be progressively changed along the battery, even though the particular simplifications and omissions mentioned in this paragraph are resorted to.

In order to complete the description of the piping shown, the following remarks may be helpful.

If the sweetwater tank 36, and its other connected parts, are used, an emergency discharged pipe 53 may be installed for connecting pipe 48 of the pressure boosting circuit with the upper end of the storage tank 36, the connection through this pipe 53 being cut off however by means of a safety valve 53ᵇ, which is normally closed to prevent circulation through pipe 53, but which opens to relieve any excessive pressure that may for any reason be built up in the high pressure portion of the booster system. A pipe 60 may also be connected with the upper end of storage tank 36, this pipe 60 being suitably connected so as to collect sweetwater that may accumulate at other stations or places of operation in the beet sugar factory.

Also outlet pipes 55 and 56, Figs. 4, and 5, connect the measuring tanks 30 and 31 respectively with the carbonation apparatus of the sugar plant, (not shown), and these pipes are provided with valves 58 and 59.

Header 70, shown in Figs. 1, 4, and 8 is an accessory pipe that is used in various ways by those accustomed to operate these diffusion batteries.

The foregoing description concludes the essential portions of the piping and other apparatus in a diffusion battery on to which one form of my apparatus has been attached for carrying out my invention of boosting the circulation pressure at a place intermediate of the ends of the battery.

I will now describe the manner of setting the valves for some of the steps in the battery operation, it being understood that these settings progress from point to point, and cell to cell along the battery as the operation continues.

Assuming that the battery is in full operation and the work progressing normally, it is realized that water under an initial pressure head will be entering one of the cells, this being the starting point in the circulation. As a matter of fact this fresh water usually enters the cell in which the cossettes are most exhausted of their sugar content. On this particular cell the valves will be set as follows: Valve 19 will be open; the two-way valve 26 will be set so as to connect valve 19 with pipe 20, and so as to cut off the pipe 25 rising diagonally and eventually connecting with the bottom of the preceding cell. Obviously this will permit the fresh water from header 17 to pass through pipe 18, valve 19, two-way valve 26, and pipe 20 into the cell at the top, from whence the circulation proceeds downward through this cell and upward through the pipe or calorisator 21 connected to the bottom of this cell and from this pipe 21 the juice passes up through valve 22, branch pipe 23, two-way valve 24 and pipe 25 into the two-way valve 26 of the next following cell. In the portion of the piping just mentioned, the two-way valve 35ᵃ, Fig. 4, is closed against the branch pipe 35ᵇ, valve 22 is open, the two-way valve 24 is open to pipe 25, but closed to pipe 24ᵃ, and the two-way valve 26 in the next succeeding cell is open so as to connect the circulation from pipe 25 through pipe 20 into the next cell. From this next cell through which the circulation is downward, the juice again rises upward through the pipe or calorisator 21 and into the top of the next cell in the same manner as just described, the setting of the valves being identical. In similar manner the circulation proceeds from cell to cell, always being downward through each cell, and upward through the intervening piping to the next cell. The fresh water which was introduced into the cell having the most exhausted cossettes, gradually becomes richer in sugar as it diffuses the sugar by osmosis from the cossettes into the juice, this enrichening of the juice proceeding cumulatively from cell to cell until the richest juice after passing over the last cell, in which the new and richest cossettes are found, leaves the battery and proceeds to the measuring tanks 30 and 31, by a setting of the valves which will presently be described.

As previously described, at a place in the foregoing circulation roughly midway along its length, or at any other desired point or points between the ends of the battery, i. e., between the cells where the fresh water is admitted at one end, and the rich juice is discharged to the measuring tank at the other end, the juice is passed thru a pressure boosting pump, from which it re-enters the next cell in the circulation at a higher pressure than it emerged at from the cell just preceding, and in view of this step or operation in the process, the speed of circulation throughout the entire battery is greatly increased, with very large benefits of a character that is well understood by those skilled in the operation of these diffusion batteries.

The setting of the valves on the last cell in the battery, where the rich juices are being led to the measuring tank 31 for ultimate discharge from the battery, are as follows: The valve 22, Fig. 4, is open, and the two-way valve 24 is closed against pipe 25, but open to pipe 24ª, so as to allow the juice to flow down through pipe 24ª into header 27, and along same into pipe 28, from which it flows either into tank 30 or 31, according as to whether the valve 29 or 33 is open. At this time the two-way valve 35ª is of course closed against pipe 35.

The headers and parts 34, 34ª, 35, 36, 37, 39, 40, 41, 42 and 52, all of which have been previously described, can be used under the following circumstances. Assuming that a cell beyond the one into which the boosted pressure is admitted, is plugged, i. e., the cossettes have plugged the bottom exit port from the cell, the tendency to do this being noticeable with bad or frozen beets, and being induced by the normal downward current of the fluid through the cossettes in the cell. Such a plug, is of course undesirable and should be removed. To remove same with the above mentioned equipment, the valve 52 corresponding with and adjacent to the open valve 50, is also opened somewhat, so that some of the high pressure juice from the high pressure header 47, will flow through pipes 40, 41, tank 36, pipe 37, header 34, pipe 34ª and into the bottom of the plugged cell by properly operating the following valves corresponding to that cell. The valve 35 is opened, the two-way valve 35ª is closed against the pipe 43ᵇ and opens valve 35 into pipe 35ᵇ, from which the fluid momentarily flows downward through pipe 21 and enters the bottom of the plugged cell, the valve 22 of course being closed to permit this action. This momentary counterflow down through pipe 21 into the bottom of the cell, has a tendency to lift and agitate the cossettes that are plugging the circulation, and as soon as this plugging action is relieved, the valves are all returned to their normal operating position, and the circulation and diffusion operation continues in its normal manner.

For certain other detailed steps in the operation which may at special times be desired, the various valves shown and indicated may be manipulated to produce same, but these various details of operation have nothing to do with the pressure boosting features which constitute the principal parts of my invention, and being well understood by those skilled in battery operations, same need not be further described herein.

In conclusion I wish to point out that the art or process of drawing the juice thru any pressure boosting means in any way interposed in the battery circulation at a place or places between the ends of the battery for the purpose of boosting the circulation pressure, in order to speed up the circulation, is broadly new and pioneer so far as I am aware, and that I broadly am the inventor thereof, and of the very substantial benefits both from improved diffusion efficiency and increased battery and factory capacity that may be obtained thereby. As previously indicated this step in the process can be performed by arranging the pressure boosting apparatus in several ways different from the one specifically and minutely described in the paragraphs just preceding, but in case the users of this invention and process desire to progressively change the place in the battery where the circulation pressure is so boosted, in order to keep this operation in relative step with the other battery operations, this can be done by installing the apparatus substantially in accordance with the detailed description which I have just given.

As one of the benefits derived from my boosted circulation pressure, and not previously mentioned, I call attention to the fact that there is sufficient pressure to both draw juice from this last cell into the measuring tanks, and also to force juice from this last cell up through the next cell of fresh cossettes which are being mashed. In the ordinary mode of operating a diffusion battery without my boosted pressure, it is very difficult, or impossible, to obtain enough pressure at the end of the battery to both draw and mash at the same time, and for this reason these operations are usually performed one after the other, which has a further effect in slowing down the battery, and results in a benefit derived by my boosted pressure as batteries equipped with same are capable both of drawing and mashing simultaneously, and this of course speeds up the overall circulation further.

Though I have described my invention as used in the process of manufacturing sugar, nevertheless both the process and apparatus described herein has application in other arts and industries wherever it is desired to extract into a liquid a desired ingredient from a substance loaded into a diffusion battery. In the sugar industry the liquid consists of water which gradually becomes rich in sugar as it circulates along the length of the battery; the desired ingredient is the sugar; and the substance loaded into the diffusion battery is the beet cuttings or cossettes as hereinbefore described; but in other arts or industries the liquor, the desired ingredient, and the original substance, together with other substances that may be present, may all be different from those in the sugar industry, but my invention is useful and applicable nevertheless, and I claim it in respect to those other arts and industries as well as for the sugar industry.

Also, various modifications of my apparatus and process, in addition to those hereinbefore specifically mentioned, will be apparent, but these are all included within the broad scope of the appended claims to which reference should be made for ascertaining the breadth of my invention.

I claim:

1. The process of extracting into liquor a desired ingredient from a substance loaded into a diffusion battery, said process consisting of circulating the liquor under an initial pressure progressively through a series of cells constituting the battery and containing the original substance, and boosting the circulation pressure of said liquor at a place intermediate of the ends of said battery by passing said liquor through a power driven pressure boosting pump provided for this purpose.

2. The process of extracting into liquor a desired ingredient from a substance loaded into a diffusion battery, said process consisting of circulating the liquor progressively through a series of cells constituting the battery and containing the original substance, and boosting the circulation pressure of said liquor at a place intermediate of the ends of said battery by interposing a power driven pressure boosting pump in the circulation at a place where the liquor passes from one of the cells into another of the cells in the series.

3. The process of extracting into liquor a desired ingredient from a substance loaded into a diffusion battery, consisting of circulating the liquor progressively through a series of cells constituting the battery and containing the original substance, and boosting the circulation pressure of said liquor at a place intermediate of the ends of said battery by interposing a power driven pressure boosting pump in the circulation at a place where the liquor passes from one cell into another cell in the series, the particular cells between which the power driven pressure boosting pump is interposed being changed progressively along the battery as the other steps in the extracting process proceed along the battery.

4. An apparatus for carrying out my herein described process, consisting of a diffusion battery having a number of cells in series, said cells being connected with each other through valves and piping so that a fluid introduced into said series of cells can circulate progressively from one cell to another along the battery, and means for boosting the circulation pressure of said fluid at a point along its course through the battery, consisting of a low pressure header connected with various of said cells through separate valves, and a high pressure header also connected to various of said cells through separate valves, said low and high pressure headers being connected to each other through a pressure boosting means, one of said valves connecting one of said cells with said low pressure header being open, while one of said valves connecting another of said cells with the high pressure header is open to cause said fluid to pass from one cell through said pressure boosting means and back into another cell at a higher pressure.

5. The process of extracting into liquor a desired ingredient from a substance loaded into a diffusion battery, said process consisting of circulating the liquor under an initial pressure progressively through a series of cells constituting the battery and containing the substance, said circulation being normally downward through said cells, normally boosting the circulation pressure of said liquor at a place intermediate of the ends of said battery by passing said liquor through a pressure boosting means, and occasionally using said pressure boosting means for establishing a temporary counterflow upward through one of said cells to relieve same of any plug which may have been produced therein during the normal downward circulation through the cell.

In testimony whereof, I have affixed my signature hereto this 27th day of July, 1927.

WILLIAM FREDERICK HOLZHEUER.